United States Patent [19]
West

[11] 4,133,325
[45] Jan. 9, 1979

[54] ENGINE SPARK TIMING SYSTEM AND METHOD WITH SUPPLEMENTARY RETARD IN NORMAL AND STARTING MODES

[75] Inventor: Gene A. West, Kokomo, Ind.

[73] Assignee: General Motors Corporation, Detroit, Mich.

[21] Appl. No.: 832,004

[22] Filed: Sep. 9, 1977

[51] Int. Cl.$^2$ .............................................. F02P 5/14
[52] U.S. Cl. ........................... 123/117 R; 123/146.5 A
[58] Field of Search .......... 123/117 R, 117 D, 117 A, 123/146.5 A, 148 E, 179 BG

[56] References Cited

U.S. PATENT DOCUMENTS

| | | | |
|---|---|---|---|
| 3,658,044 | 4/1972 | Safstrom | 123/148 DS |
| 3,890,944 | 6/1975 | Werner et al. | 123/117 R |
| 3,901,201 | 8/1975 | Mizuguchi et al. | 123/117 R |
| 4,063,538 | 12/1977 | Powell et al. | 123/146.5 A |
| 4,085,714 | 4/1978 | Hattori et al. | 123/117 R |

Primary Examiner—Kathleen H. Claffy
Assistant Examiner—Gerald L. Brigance
Attorney, Agent, or Firm—Robert M. Sigler

[57] ABSTRACT

An engine spark timing system includes pulse generating apparatus effective to generate conventional spark timing pulses, apparatus, including a first capacitor, effective to vary the voltage across the first capacitor in one direction at a first rate toward a reference voltage and generate a retarded spark timing pulse when the first voltage is reached, apparatus initiated at the time the retarded spark timing pulse is generated to vary the voltage across the capacitor in the opposite direction at a second rate until the next conventional spark timing pulse and apparatus responsive to engine start and one or more other engine operating conditions to substitute selected retarded spark timing pulses for the corresponding conventional spark timing pulses in the firing of the engine spark plugs. In order that the capacitor voltage not reach its maximum value and clip during the slower engine speeds typical of engine start, apparatus responsive to the actuation of engine cranking means is effective to insert a second capacitor parallel with the first capacitor to slow the rates of voltage change across the capacitor in both directions in the same proportion.

3 Claims, 6 Drawing Figures

| HIGH MANIFOLD VACUUM | WARM ENGINE | HIGH ENGINE SPEED | ENGINE START | RETARD | | |
|---|---|---|---|---|---|---|
| | | | | NONE | SMALL | LARGE |
| 0 | 1 | 0 | 0 | | X | |
| 0 | 1 | 1 | 0 | | X | |
| 0 | 0 | 0 | 0 | | | X |
| 0 | 0 | 1 | 0 | | | X |
| 1 | 1 | 0 | 0 | | X | |
| 1 | 1 | 1 | 0 | X | | |
| 1 | 0 | 0 | 0 | | | X |
| 1 | 0 | 1 | 0 | | | X |
| | | | 1 | | | X |

Fig. 6

ENGINE SPARK TIMING SYSTEM AND METHOD WITH SUPPLEMENTARY RETARD IN NORMAL AND STARTING MODES

BACKGROUND OF THE INVENTION

This invention relates to spark timing systems for spark ignited, internal combustion engines and particularly for those which have apparatus for generating conventional spark timing pulses from engine crank angle, speed and manifold vacuum inputs and retarded spark pulses corresponding to said conventional spark timing pulses but retarded therefrom by a crank angle determined by one or more other engine operating conditions.

One method of providing the retarded spark timing pulses, shown in the prior art, is the technique of varying the voltage across a capacitor in a first direction toward a reference voltage at a first rate, generating a retarded spark pulse when a voltage reaches the reference voltage and, when the retarded spark pulse is generated, reversing the direction of voltage change and changing the voltage in the opposite direction at a second rate until the next conventional spark timing pulse. In this techinque, one of the first and second rates is constant while the other may be constant or vary according to one or more sensed engine operating conditions; and the amount of retard for each retarded spark timing pulse is thus controlled as a function of crank angle independently of engine speed.

It may be found desirable, with such a system to generate the retarded spark timing pulses during engine start as well as normal running conditions. Engine speed during at least the beginning of its starting mode, however, is determined by the speed of the cranking motor and is normally significantly slower than normal engine idle speed. A typical engine cranking speed might be 200 rpm, compared with a sample normal engine operating speed range of 700 rpm at idle to 5,000 rpm maximum. In the system described above, the voltage across a capacitor changes in the opposite direction from the reference to a peak voltage before it is change back toward the reference. This peak voltage varies with engine speed, becoming greater as the engine speed decreases. Since the normal range of engine speeds is already great, the system is normally designed so that the maximum difference between the peak voltage and the reference, which occurs at idle speed, normally about 700 rpm, is close to the maximum voltage that the vehicle electrical system can produce across the capacitor. Thus, operation at cranking speed of 200 rpm would require the system to charge the capacitor to almost three times the maximum available DC voltage. This is, of course, impossible; and the voltage across the capacitor would stop changing when the maximum was reached, thereby clipping and distorting the retard angle of the retarded spark timing pulses.

SUMMARY OF THE INVENTION

This invention provides a spark timing system of the type described above which produces accurate retarded spark timing pulses during the engine start mode at slow cranking speeds as well as during the full range of normal engine operation. This invention provides a second or supplementary capacitor which may be connected in parallel with the first capacitor in response to a signal generated during engine start. With a second capacitor in parallel with the first, the total capacitance is increased and, the charging current being unchanged, the rate of change of the voltage across the two capacitors is slower than the rate of change in voltage of the first capacitor alone. The capacitance of the second capacitor is chosen so that the combined first and second capacitors are not charged past the limit of the vehicle electrical system during the engine start mode.

The addition of the second capacitor and resultant change in total capacitance, of course, varies the rate of change in the capacitor voltage in both directions by the same proportion. Thus the addition of the second capacitor does not change the retard angle of the retarded spark timing pulses from what they are designed to be with only the first capacitor. The only change is the beneficial and desired change of greater capacity so that the capacitor voltage does not clip during engine start load and the desired retard angles are thus maintained.

Further details and advantages of this invention will be apparent from the accompanying drawings and following description of a preferred embodiment.

DESCRIPTION OF A PREFERRED EMBODIMENT

Figure 1:
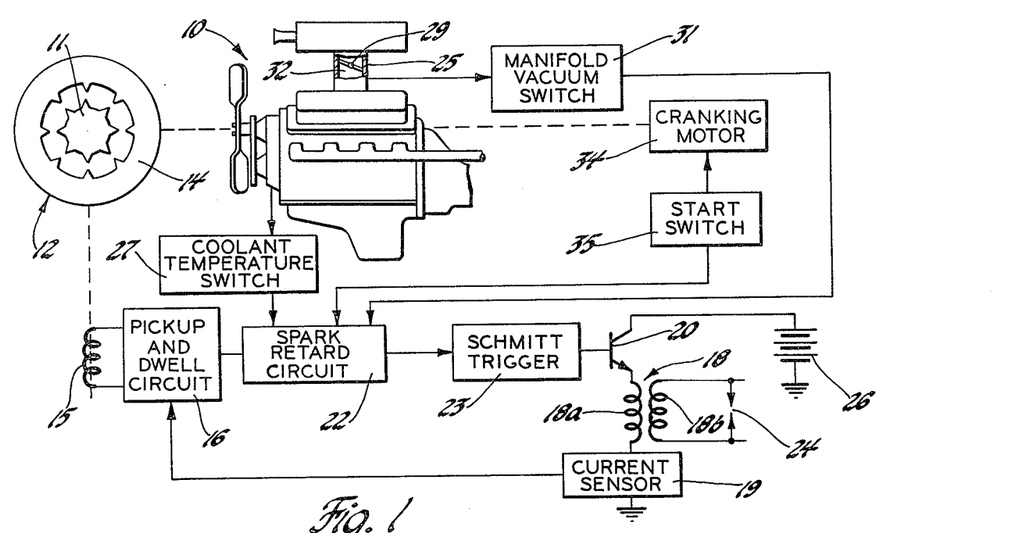
FIG. 1 shows an engine with a spark timing system according to this invention.

Referring to FIG. 1, an internal combustion engine 10 has a rotating crankshaft which drives the rotor 11 of an alternating current signal generator 12. Generator 12 is a standard spark timing signal generator of the variable reluctance type disclosed and described in the U.S. Pat. No. 3,254,247 to Falgy which issued May 31, 1966. Generator 12 also includes a stator 14 and pickup coil 15 and provides a plurality of equally spaced projections around rotor 11 and stator 14 related to the number of cylinders in engine 10. Relative rotation between the rotor 11 and stator 14 at a speed proportional to engine speed produces a pulsating variation in reluctance which induces an alternating voltage signal in coil 15 in a manner well-known in the prior art.

The alternating voltage signal in coil 15 is applied to pickup and dwell circuit 16 which generates at its output an alternating voltage signal similar in shape but shifted upward and downward with reference to a fixed reference voltage. In this case, each upward crossing of the reference voltage by the alternating voltage signal can be referred to as a coil-on signal; and each downward crossing of the reference voltage by the alternating voltage signal can be referred to as a coil-off, or conventional spark timing signal. A current sensor 19 can be provided to sense the current through the primary 18a of a spark coil 18 and provide a feedback signal thereof to pickup and dwell circuit 16 whereby the alternating voltage signal can be shifted with respect to the reference voltage to control the dwell time between the coil-on and coil-off signals and therefore the maximum current and energy build-up in the coil.

The output of pickup and dwell circuit 16 is provided to spark retard circuit 22, to be described below. The output of circuit 22 is provided to a Schmitt trigger 23, the switching voltage of which as the aforementioned reference voltage. Schmitt trigger 23 thus switches a transistor 20 on and off to control current through spark coil primary 18a in accordance with the alternating voltage signal as shifted in pickup and dwell circuit 16 and modified in spark retard circuit 22. When current flows through spark coil primary 18a, electromagnetic energy builds up in the spark coil 18; and when current is cut off by transistor 20 this energy is released in a high voltage spark pulse induced in spark coil secondary 18b, which spark pulse is provided to an appropriate spark plug 24 through the standard distributor, not shown. The dwell time, or time in which current is allowed by transistor 20 to flow through spark coil primary 18a, is continually adjusted by the aforementioned feedback signal so that current flows for a time sufficient to build up the required electromagnetic energy in spark coil 18 but for no longer than this sufficient time, to prevent unnecessary power dissipation in transistor 20. Those skilled in the art recognize that pickup and dwell circuit 16 and Schmitt trigger 23 are well known in the art, a published example being the U.S. Pat. to Richards et al No. 3,828,672, issued Oct. 1, 1974. Spark retard circuit 22 is inserted at the top of the pickup coil, between point 9a and resistor 37, FIG. 1, in the aforementioned Richards et al patent disclosure.

Still referring to FIG. 1, a battery 26 represents a standard vehicle DC voltage and current source of battery, alternator and voltage regulator. Battery 26 is shown as being connected to supply current through transistor 20 to spark coil primary 18a; however, it is also understood to supply the electrical power for all other electrical systems on the vehicle, including those shown in this system.

Engine 10 is provided with a coolant temperature switch 27, which is not the normal over-temperature switch but is an additional switch with a temperature switch point to indicate an engine which is "warmed-up". Engine 10 further is the type equipped with a carburetor 25 or similar device in which the induction of air is controlled by a throttle 29 which creates a region 32 of depressed pressure relative to atmospheric pressure. A manifold vacuum switch 31 is effective to sense this vacuum and switch at a certain vacuum level.

Finally, engine 10 is equipped with a standard, electrically powered cranking motor 34 connectable by the usual apparatus, not shown, to turn the crankshaft of engine 10 in the normal manner upon actuation by a start switch 35 and disengage automatically when the engine begins running on its own power and increases in speed toward idle speed. As indicated in FIG. 1, start switch 35, as well as coolant temperature switch 26 and manifold vacuum switch 31, provide signals to spark retard circuit 22.

Figure 2:
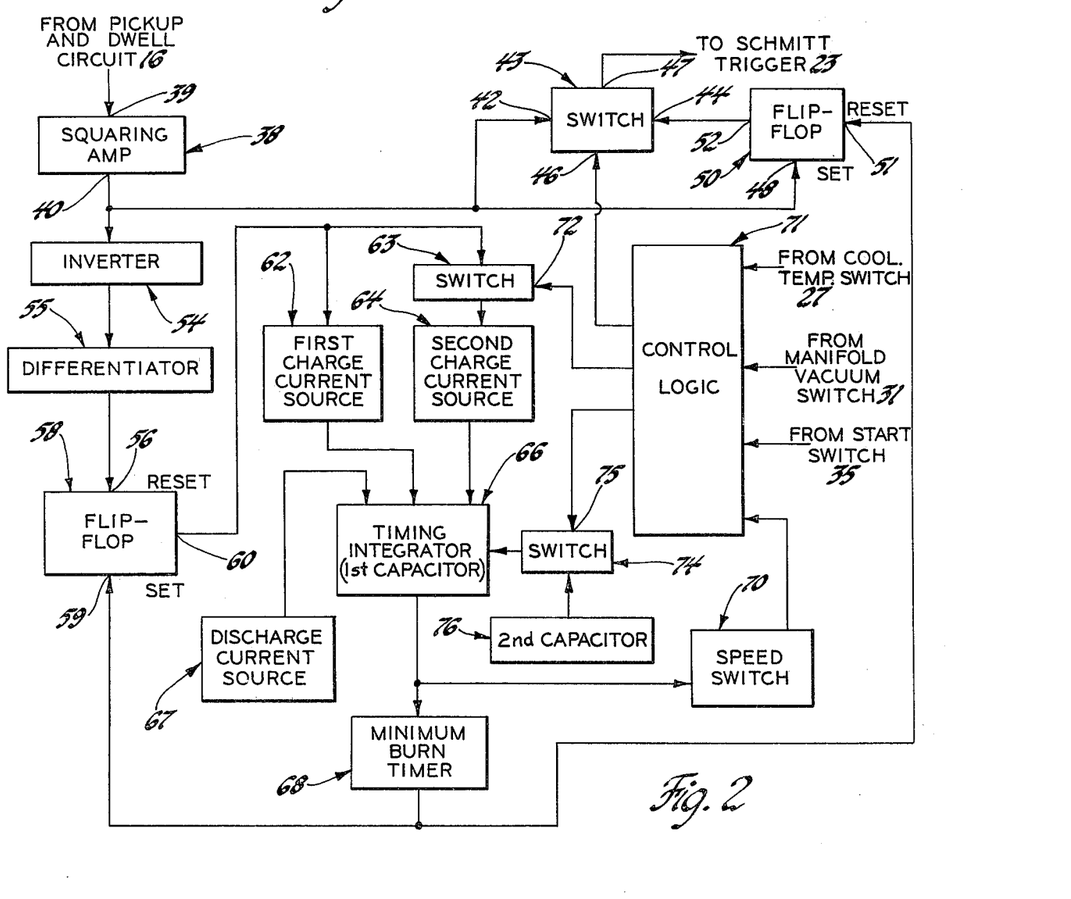
FIG. 2 shows a block diagram of a portion of the engine spark timing system of FIG. 1.

Spark retard circuit 22 is shown in block diagram form in FIG. 2. A squaring amp 38 receives the output of pickup and dwell circuit 16 on an input 39, compares it to a reference designed to be the same as that of Schmitt trigger 23 and thus squares the wave form into a square wave in which up pulses represent coil-on signals and down pulses represent coil-off or conventional spark timing signals, and which square wave corresponds to that which would be produced by Schmitt trigger 23 in the absence of spark retard circuit 22.

The output 40 of squaring amp 38 is connected to an alternate input 42 of a switch 43, which has another alternate input 44, a control input 46 and an output 47. Output 40 of squaring amp 38 is also connected to the set input 48 of a flip-flop 50, which has a reset input 51 and an output 52. Output 40 of squaring amp 38 is further connected through an inverter 54 and differentiator 55 to the reset input 56 of a flip-flop 58 having a set input 59 and an output 60.

The output 60 of flip-flop 58 is connected to a first charge current source 62 and, through a switch 63, to a second charge current source 64. First charge current source 62 is adapted, when actuated by flip-flop 58, to supply charging current to a timing integrator 66. Second charge current source 64 is adapted, when it is actuated by flip-flop 58 through switch 63, to supply a second constant charge current to timing integrator 66 which adds to the first charge current. Finally, a discharge current source 67 supplies a constant discharge current to timing integrator 66.

Timing integrator 66 supplies a signal through a minimum burn timer 68 to set input 59 of flip-flop 58 and to reset input 51 of flip-flop 50. Output 52 of flip-flop 50 is connected to alternate input 44 of switch 43.

Timing integrator 66 also supplies a signal to a speed switch 70. Speed switch 70 supplies a signal to a control logic 71, which also receives signals from coolant temperature switch 27, manifold vacuum switch 31 and start switch 35. Control logic 71 contains an internal logic program to control switch 63 through a control input 72 and switch 43 through control input 46 and thereby vary the spark timing of engine 10 according to the logic table shown in FIG. 6. In addition, control logic 71 controls a switch 74 through a control input 75, which switch 74 controls the coupling of a capacitor 76 with a corresponding capacitor in timing integrator 66.

Figure 3:
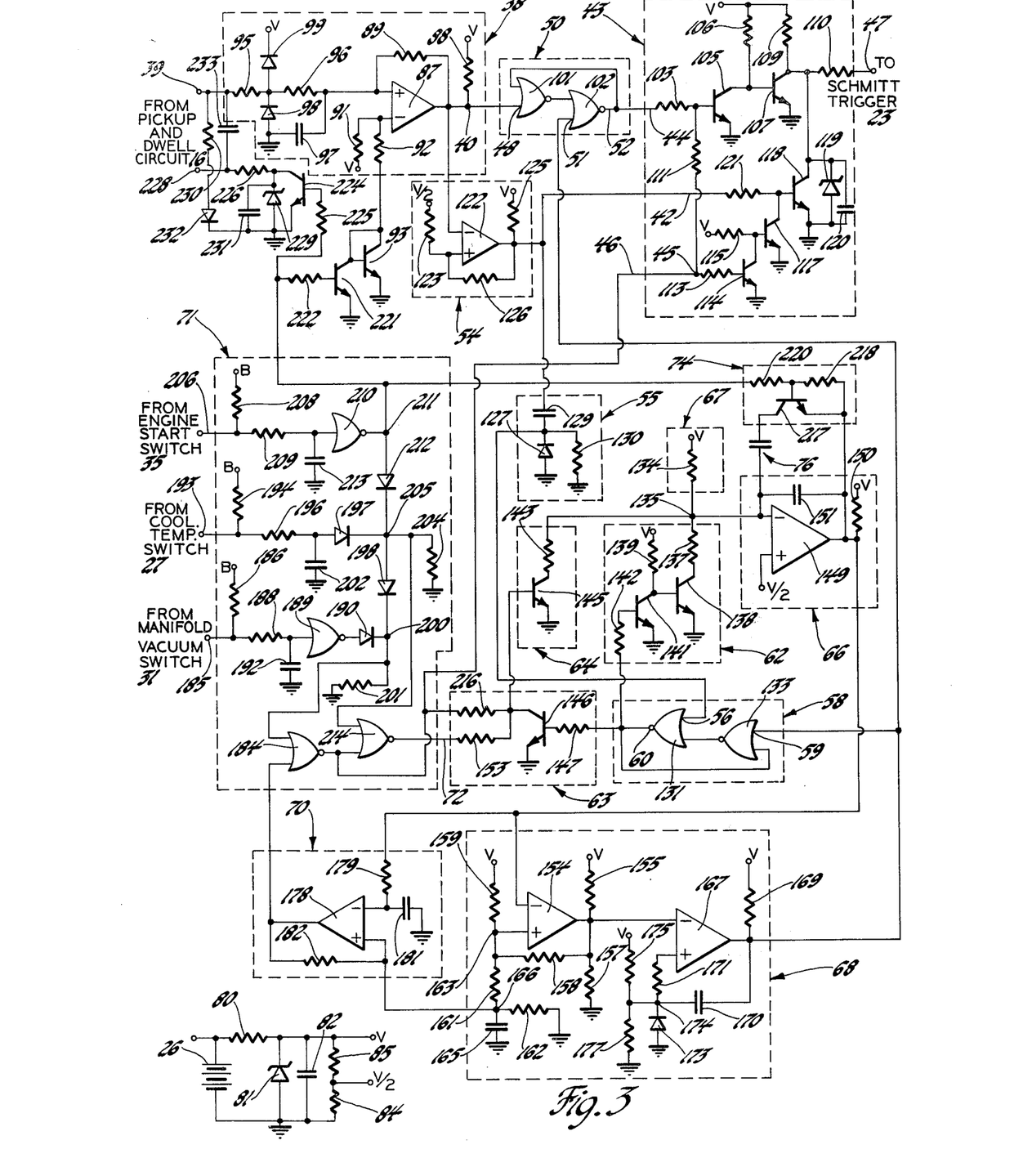
FIG. 3 shows a circuit diagram of an embodiment of the system shown in block diagram form in FIG. 2.
Figure 4:
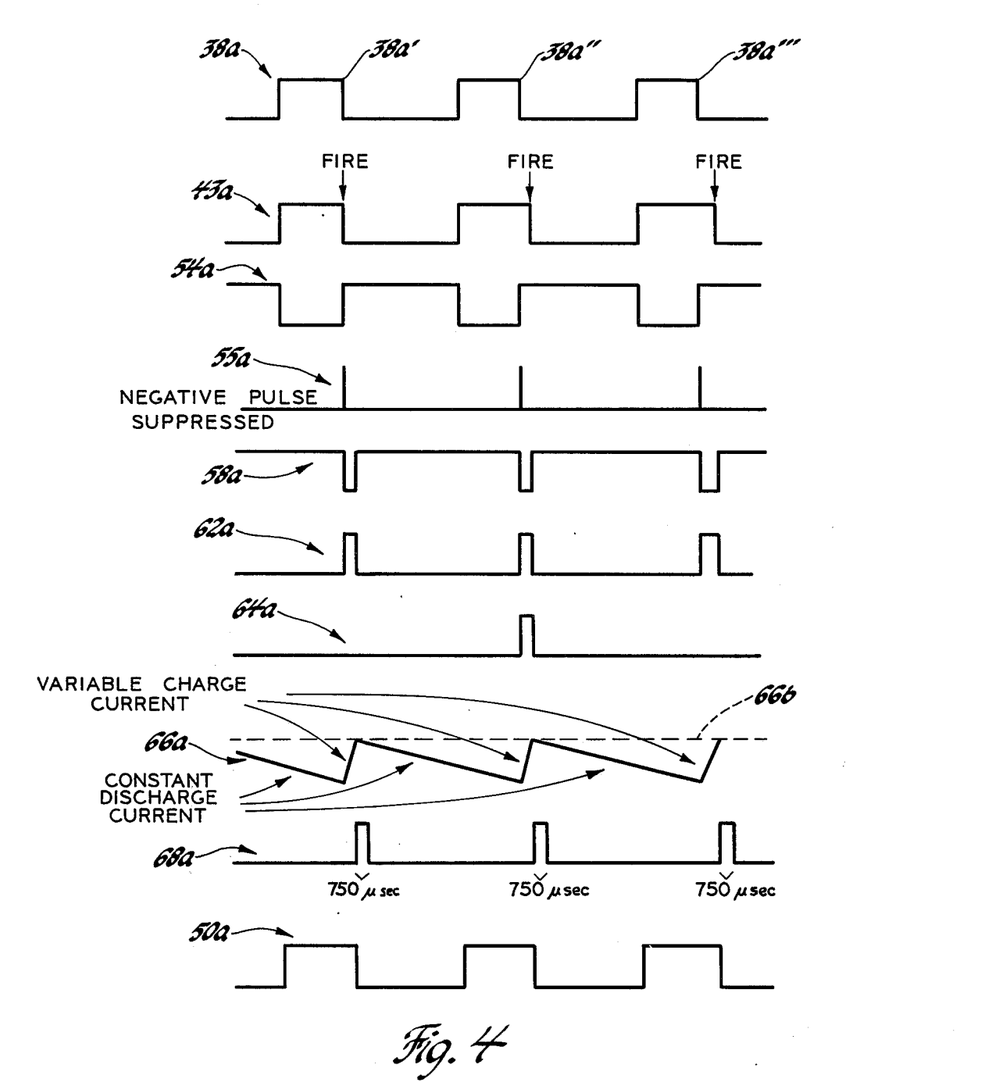
FIG. 4 shows a set of wave forms showing the time variation of voltage at a variety of points in the system of FIGS. 2 and 3.

The operation of the system of FIGS. 1 and 2 will be briefly described with reference to the wave forms of FIG. 4, before the more detailed circuit of FIG. 3 is described. With reference to FIG. 4, each wave form is the output of one of the blocks shown in FIG. 2 and is identified by adding the letter "a" after the reference numeral of the appropriate block. In addition, the wave forms of FIG. 4 are arranged to show the events of three consecutive spark firings: the first occurring at the normal time as determined by a conventional spark firing pulse, the second occurring at a time retarded from the conventional spark timing pulse by a first retard angle, and the third being retarded from the conventional spark firing pulse by a second retard angle greater than the first retard angle. It is understood that the representation of these three specific spark events in this order is for demonstration purposes and is not meant to imply that three consecutive spark events with these timings typically occur in this combination and order in the normal operation of engine 10. The conventional spark timing pulses initiating the three above-described spark events are indicated in wave form 38a, the output of squaring amp 38, as pulse 38a', pulse 38a'' and pulse 38a'''. The resulting variations in any other wave form as determined by control logic 71 may be determined by proceeding directly downward from the appropriate pulse in wave form 38a to the desired wave form and then proceeding to the right.

The conventional spark timing pulses 38a', 38a", and 38a''', are those determined by pickup and dwell circuitry 16 in response to AC wave generator 12, and thus have a conventional spark timing with respect to top dead center as determined by a basic spark timing setting, a manifold vacuum advance and an engine speed or centrifugal advance. They occur at the same times as they would occur if spark retard circuit 22 did not exist and Schmitt trigger 23 was connected directly with pickup and dwell circuit 16 as in the previously mentioned Richards et al reference. Thus, it can be seen that if control logic 71 places switch 43 in condition to connect alternate input 42, rather than alternate input 44, with output 46, conventional spark timing pulse 38a' is provided directly to Schmitt trigger 23 to shut off current in transistor 20 and spark coil primary 18a and thus fire spark plug 24 at the normal time, as seen in wave form 43a. Control logic 71 is programmed to place switch 43 in this condition during normal highway driving with a warm engine, high manifold vacuum, high engine speed and no engine cranking, as seen in the logic table of FIG. 6; and no additional retard is thus provided during normal highway driving. Of course, the reset of the system of FIG. 2 continues to operate; but its output—a down pulse on the output 52 of flip-flop 50, is blocked by switch 43. As shown in FIG. 4, its operation is similar to the operation following conventional spark timing pulse 38a", which will be described at a later point in this description.

Figure 6:
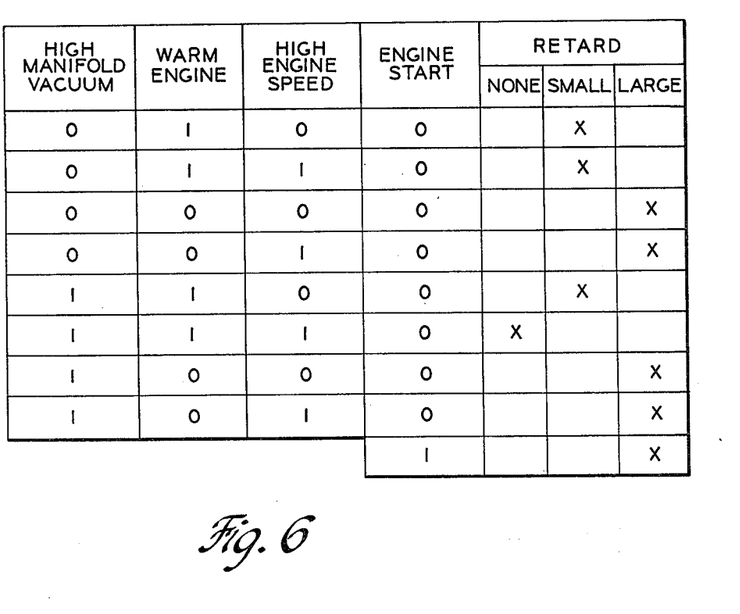
FIG. 6 is a logic table describing the determination of supplementary retard angle determined by the circuit of FIG. 3 as a function of certain engine operating conditions.

To produce the large retard indicated in the table of FIG. 6, control logic 71 causes switch 43 to connect output 46 to alternate input 44 rather than alternate input 42. Conventional spark timing pulse 38a''' on output 40 of squaring amp 38 is inverted in inverter 54, as shown in wave form 54a and differentiated in differentiator 55 to produce a positive pulse as shown in wave form 55a. This pulse, provided to reset input 56, causes flip-flop 58 to switch to a low output on output 60 as seen in wave form 58a, and actuates first charge current source 62, as seen in wave form 62a. The magnitude of current from first charge current source 62 is much greater than that from discharge current source 67: therefore the output of timing integrator 66 ramps upward, as seen in wave form 66a, until it reaches a reference voltage 66b.

When the output of timing integrator 66, shown as wave form 66a, reaches level 66b, a comparator in minimum burn timer 68 switches to a high output, as seen in wave form 68a, which is immediately provided to reset input 51 of flip-flop 50 to cause the output 52 of flip-flop 50 to switch low, as seen in wave form 50a, in a down pulse, known herein as a retarded spark timing pulse, which is provided through switch 43 to Schmitt trigger 23 to fire spark plug 24 in the conventional manner. The retard or delay in the retarded spark firing pulse with reference to the conventional spark timing pulse is determined by the crank angle through which the engine moves as the output 66a of timing integrators 66 moves from its low point to reference level 66b, and thus on the magnitude of the difference between the first charge current from source 62 and the discharge current from source 67.

The upward pulse from minimum burn timer 68 is also provided to the set input of flip-flop 58 to cause its output 60 to switch high and deactivate first charge current source 62. The result is that timing integrator 66 starts ramping downward at a slow rate determined by the magnitude of discharge current source 67 until flip-flop 58 is again switched low by the next conventional spark timing pulse.

Minimum burn timer 68 contains a one shot multivibrator which does not introduce any delay into the reset of flip-flop 50 or the set of flip-flop 58, but prevents flip-flop 50 from switching high again for a minimum time, which may be for example, 750 microseconds. This ensures a minimum current of duration in spark coil primary 18a and thus a minimum spark burn time in the cylinder, in spite of the possible arrival of a new upward or coil-on pulse from squaring amp 40 to set input 48 of flip-flop 50, as might possibly occur at high engine speeds with a large retard. Flip-flops 50 and 58, as will be seen at a later point in this description, are the type in which the reset input dominates: that is, if high signals are present on both set and reset inputs simultaneously, the output remains low until the high input disappears from the reset input. Further details of the minimum burn timer will be found in the U.S. patent application Ser. No. 789,801, Engine Spark Timing System With Retard Means and Minimum Burn Timer by Gene West, filed Apr. 22, 1977 and assigned to the assignee of this application.

To produce the small retard indicated in the table of FIG. 6, control logic 71 maintains switch 43 with input 44 connected to output 46 and further closes switch 63 so that, when flip-flop 58 switches to a low output on output 60, second charge current source 64 is actuated simultaneously with first charge current source 62. This produces a greater charge current than the first charge current alone and thus causes timing integrator 66 to ramp upward at a faster rate and reach reference level 66b in a shorter crank angle. Wave form 64a shows the actuation of second charge current source 64, which is also deactivated simultaneously with first charge current source 62 when the output 60 of flip-flop 58 switches high once again.

Figure 5:
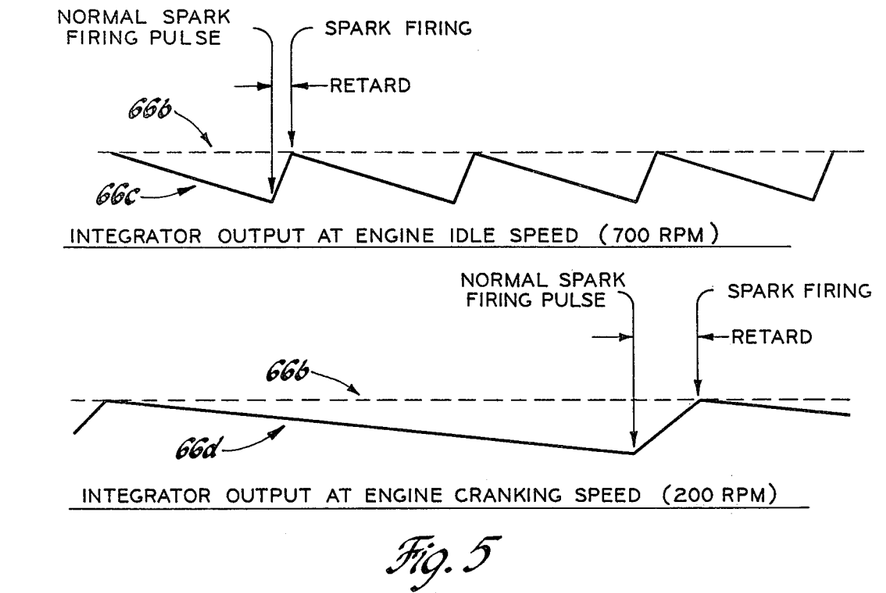
FIG. 5 shows a set of wave forms representing the time variation of the voltage at a point in the system of FIGS. 2 and 3 at engine idle speed and engine cranking speed.

The operation of the spark timing system of FIGS. 1 and 2 during actuation of cranking motor 34 to start engine 10 will be described with reference to the wave forms of FIG. 5. The output of integrator 66 at a typical engine idle speed of 700 rpm is shown as wave form 66c of FIG. 5. The output ramps downward until the normal or conventional spark firing pulse occurs, at which point it ramps upward until it reaches reference level 66b, produces the retarded spark timing pulse and begins ramping downward once again. If the engine were being cranked by cranking motor 34 at a typical cranking speed of 200 rpm, it can be seen by examination of the basically triangular wave form of 66c that the output of timing integrator 66 would have to ramp downward more than three times as far before it began ramping upward toward level 66b. On the other hand, if the engine were being operated at high speed, approximately 5,000 rpm, it can be seen that the output of timing integrator 66 would ramp downward only about one-seventh as far as shown in wave form 66c before it begins ramping upward. It is not practical to try to encompass this extended range of engine speed with one capacitor of unchanging capacitance in timing integrator 66. Thus, control logic 71 is responsive to start switch 35 to close switch 74 and thus couple second capacitors 76 into timing integrator 66. The result is the wave form 66d of FIG. 5 which shows a smaller ramping rate downward and upward than appears in wave form 66c. Although the up and down ramping rates are both smaller for wave form 66d, they are equally small proportionally and thus the crank angle of retard is not affected. The apparent difference in retard shown in FIG. 5 is due to the fact that FIG. 5 is a time domain diagram rather than a crank angle domain diagram. Naturally, at the slower speed of 200 rpm, a crank angle of a rotating member occupies a greater length of time than the same crank angle of a member rotating at 700 rpm and therefore takes more horizontal space in FIG. 5.

FIG. 3 shows a circuit embodiment of the system shown in block diagram form in FIG. 2. The elements in FIG. 3 are grouped and shown, where possible, in blocks which correspond to the blocks shown in FIG. 2. The circuit of FIG. 3 is powered by a regulated DC power supply comprising a resistor 80 and zener diode 81 connected between battery 26 and ground. The supply further comprises a capacitor 82 connected in parallel with zener diode 81 and a series pair of resistors 84 and 85, equal in resistance and connected in parallel with capacitor 82. A regulated voltage V is obtained across capacitor 82; and a voltage V/2, equal to one-half voltage V, is obtained across resistor 84.

Squaring amp 38 comprises an operational amplifier or op amp 87, the output of which is connected to power source V through a resistor 88 and fed back through a resistor 89 to its non-inverting input. Resistors 88 and 89 cause op amp 87 to act as a comparator, comparing its non-inverting and inverting inputs and switching its output high or low, depending on which input is greater. The inverting input of op amp 87 is connected to the junction of a series pair of resistors 91 and 92, with the other end of resistor 91 connected to power source V and the other end of resistor 92 connected to the collector of a transistor 93. Transistor 93 has its emitter grounded and its base connected to the collector, so that it presents the characteristics of a switch having a diode voltage drop when conducting. Transistor 93 is biased on during normal operation of the circuit. The input 39 to squaring amp 38, which receives the output of pickup and dwell circuit 16, is connected through a pair of series resistors 95 and 96 to the non-inverting input of op amp 87. A capacitor 97 is connected between the non-inverting input of op amp 87 and ground. Ground is connected through a diode 98 to the junction of resistors 95 and 96 and, from there, through a diode 99 to power source V. Diodes 98 and 99 protect op amp 87 from voltages greater than V or less than ground.

The output of pickup and dwell circuit 16 is thus supplied through resistors 95 and 96 to the positive input of op amp 87, in which it is compared with the reference voltage at the junction of resistors 91 and 92. The values of resistors 91 and 92 and the characteristics of transistor 93 are picked to duplicate the switching characteristics of Schmitt trigger circuit 23 as shown in the previously described Richards et al reference. Resistors 91 and 92 set the basic voltage switching level; and transistor 93, which presents a diode voltage drop when conducting, provides the proper temperature variation.

Flip-flop 50 comprises a pair of NOR gates 101 and 102, one of the inputs of NOR gate 101 comprising set input 48 and one of the inputs of NOR gate 102 comprising reset input 51. The output of NOR gate 102 comprises output 52 and is connected to the other input of NOR gate 101; and the output of NOR gate 101 is connected to the other input of NOR gate 102. This is a standard flip-flop or bistable circuit having a first stable state with a high output at output 52 actuated by a high input on input 48 and a second stable state with a low output on output 52 actuated by a high input on input 51. It will also be seen that input 51 is dominant and produces, as long as it is high, a low output on output 52, regardless of the input on input 48.

Op amp 87 has its output connected to input 48 of NOR gate 101; and output 52 of NOR gate 102 is connected through a resistor 103 to the base of an NPN transistor 105 having a grounded emitter and a collector connected through a resistor 106 to potential source V. The collector of transistor 105 is also connected to the base of an NPN transistor 107 having a grounded emitter and a collector connected through a resistor 109 to power source V and through a resistor 110 to Schmitt trigger 23. The base of transistor 105 is connected through a pair of series resistors 111 and 113 to the base of an NPN transistor 114 having a grounded emitter and a collector connected through a resistor 115 to potential source V. The collector of transistor 114 is also connected to the base of an NPN transistor 117 having a grounded emitter and a collector connected to the base of an NPN transistor 118, which has a grounded emitter and a collector connected to the collector of transistor 107. A zener diode 119 and capacitor 120 in parallel are connected from the collectors of transistors 107 and 118 to ground.

Transistors 105, 107, 114, 117 and 118, along with their associated resistors and other elements, together comprise switch 43. A resistor 121, connected to the base of transistor 118, comprises alternate input 42; while resistor 103 comprises alternate input 44. The junction of resistors 111 and 113 comprises control input 46; while resistor 110 provides output 47 to Schmitt trigger 23.

Inverter 54 comprises an op amp 122 having an inverting input connected to the output of op amp 87, a non-inverting input connected through a resistor 123 to potential source V/2, and an output connected both through the resistor 125 to potential source V and back through a resistor 126 to the non-inverting input. The output of op amp 122 is further connected through resistor 121 to the base of transistor 118.

In the operation of the elements described to this point, when the voltage at input 46 is high, transistors 105 and 114 are turned on. Transistor 105 is thus unresponsive to the condition of flip-flop 50 and isolates it from Schmitt trigger 23. Transistor 114 turns off transistor 117 to free transistor 118 to be switched by op amp 122. Thus, when op amp 87 switches high, due to an increase in the voltage supplied through input 39 above the reference determined by resistors 91 and 92, op amp 122 switches low, transistor 118 switches off and output 47 produces an immediate high output to Schmitt trigger 23. Likewise, op amp 87 switching low, which constitutes a conventional spark timing pulse, causes op amp 122 to switch high, transistor 118 to turn on and the conventional spark timing pulse to be applied immediately to Schmitt trigger 23.

When the voltage at input 46 is low, however, transistors 105 and 114 are turned off. Transistor 107 is thus freed to be controlled by flip-flop 50; and transistor 117 is turned on to hold transistor 118 off and isolate Schmitt trigger 23 from op amp 122. Now when op amp 87 switches high, flip-flop 50, if permitted by minimum burn timer 68, switches high, thus turning on transistor 105, turning off transistor 107 and providing a high output to Schmitt trigger 23. When op amp 87 switches low, it has no direct effect on flip-flop 50 but causes the spark retard circuitry yet to be described to produce an up pulse or retarded spark timing pulse through minimum burn timer 68 to switch flip-flop 50 low, turn off transistor 105 and turn on transistor 107, whereupon a low output is provided to Schmitt trigger 23 in time with the retarded spark timing pulse.

Differentiator 55 comprises a diode 127 connected from ground through a capacitor 129 to the output of op amp 122 and a resistor 130 connected in parallel with diode 127. The switching of the output of op amp 122 from the low to the high state causes a high, sharp voltage pulse to be generated at the junction of diode 127 and capacitor 129. Diode 127 prevents the voltage at that junction from dropping below ground when the output of op amp 122 switches in the opposite direction and thereby suppresses similar negative pulses.

Flip-flop 58 comprises a pair of NOR gates 131 and 133, NOR gate 131 having an input comprising reset input 56 of flip-flop 58 and NOR gate 133 having an input comprising set input 59 of flip-flop 58. The output of each of NOR gates 131 and 133 is connected to the other input of the other; and the output of NOR gate 131 further comprises output 60 of flip-flop 58. Input 56 is connected to the junction of diode 127 and capacitor 129 in differentiator 55.

A resistor 134 is connected from potential source V to a junction 135. Junction 135 is connected through a resistor 137 to the collector of an NPN transistor 138 having a grounded emitter and a base connected through a resistor 139 to potential source V. The base of transistor 138 is further connected to the collector of an NPN transistor 141 with a grounded emitter and a base connected through a resistor 142 to output 60 of NOR gate 131.

Junction 135 is further connected through a resistor 143 to the collector of an NPN transistor 145 having a grounded emitter and a base connected to the collector of an NPN transistor 146, which has a grounded emitter and a base connected through a resistor 147 to output 60 of NOR gate 131. Junction 135 is finally connected to the inverting input of an op amp 149 having a non-inverting input conected to potential source V/2 and an output connected through a resistor 150 to potential source V and through feedback capacitor 151 to the negative input.

The elements just described are grouped as shown in FIG. 3. Op amp 149, together with capacitor 151 and resistor 150, comprises timing integrator 66, the output of which is the output of op amp 149 and the input of which is summing junction 135. Thus, resistor 134 and potential source V comprise discharge current source 67 having a constant current determined by the resistance of resistor 134. In addition, transistors 141 and 138 and their associated resistors comprise first charge current source 62, which provides a constant charge current substantially determined by the resistance of resistor 137. Transistor 145 and resistor 143 comprise the second charge current source 64 having a charge current substantially determined by the resistance of resistor 143. Transistor 146 and resistor 147 comprise the switch 63 having an input 72 through a resistor 153 connected to the collector of transistor 146.

In operation, current flows continually from potential source V through resistor 134 into summing junction 135. When the output 60 of NOR gate 131 is switched high by set input 59, transistor 141 is turned on to turn transistor 138 off. In addition, transistor 145 is off, due to the turning on of transistor 146. Thus, the only current into summing junction 135 is from discharge current source 67 and the output of op amp 149 ramps downward at a slow rate determined by the resistance of resistor 134.

When a high input to input 56 of flip-flop 58 produces a low output on output 60, transistor 141 turns off and causes transistor 138 to turn on. Resistor 137 is of such value as to carry a far larger current than resistor 134 and thus require an additional current flowing into summing junction 135 from capacitor 151.

Op amp 149 will therefore ramp upward at a rate much faster than the downward ramping rate. If a low voltage is provided through resistor 153 to the base of transistor 145, the upward ramping rate will be determined by resistors 137 and 134 in conjunction with capacitor 151. If a high voltage is provided to the base of transistor 145, however, transistor 145 will turn on and resistor 143 will be placed in parallel with resistor 137, thus increasing the current drawn from capacitor 151 and therefore the upward ramping rate of op amp 149.

Minimum burn timer 68 comprises an op amp 154 having an inverting input connected to the output of op amp 149 and an output connected through a resistor 155 to potential source V, through a resistor 157 to ground, and through a resistor 158 to a non-inverting positive input. Three resistors 159, 161 and 162 comprise a voltage divider between potential source V and ground. The positive input of op amp 154 is connected to the junction 163 of resistors 159 and 161 and thus through resistor 159 to potential source V. A capacitor 165 is connected between junction 166 of resistors 161 and 162 and ground, thus placing capacitor 165 in parallel with resistor 162. Op amp 154 acts basically as a comparator, comparing the output voltage of op amp 149 with a reference at the junction 163, which is designed to produce a reference voltage equal to reference level 66b in the wave forms of FIGS. 4 and 5.

Minimum burn timer 68 further comprises an op amp 167 having an inverting input connected to the output of op amp 154 and an output connected to potential source V through a resistor 169, to input 51 of NOR gate 102, to input 59 of NOR gate 133 and back through a capacitor 170 and resistor 171 to the non-inverting input. A diode 173 is connected from ground to the junction 174 of resistor 171 and capacitor 170; and junction 174 is further connected through a resistor 175 to potential source V and a resistor 177 to ground. In the operation of minimum burn timer 68, when the output of op amp 149 is below reference level 66b, the output of op amp 154 is high and the output of op amp 167 is low. When the output of op amp 149 ramps upward and reaches reference level 66b, op amp 154 switches low, and op amp 167 switches high. Since the voltage across capacitor 170 cannot change instantaneously, the voltage at junction 174 jumps high from its normal value determined by resistors 175 and 177 to a voltage far higher and begins to ramp downward as capacitor 170 charges. Immediately as op amp 167 switches high, flip-flop 50 is switched low and flip-flop 58 is switched high. The switching of flip-flop 50 low constitutes a retarded spark timing pulse. The switching of flip-flop 58 high immediately reverses the ramping direction of op amp 149, with the result that op amp 154 switches high again almost immediately after it is switched low. However, a higher voltage is still supplied to the non-inverting input of op amp 167 from junction 174 and the output of op amp 167 therefore remains high until the voltage at junction 174 has ramped downward to the point where the non-inverting input to op amp 167 falls below the inverting input, whereupon the output switches low once again. It is only at this time that the high input is removed from input 51 of flip-flop 50; and a minimum burn time for spark plug 24 is thus assured. Of course, if the voltage at junction 45 of switch 43 is such that flip-flop 50 is isolated from Schmitt trigger 23 as previously described, minimum burn timer 68 will have no such effect. However, in that case no retard will be produced and thus the assurance of minimum burn timer 68 is not needed.

Speed switch 70 comprises an op amp 178 having an inverting input connected through a resistor 179 to the output of op amp 149 and through a capacitor 181 to ground, a non-inverting input connected to the junction 166 in minimum burn timer 68 and an output connected through a resistor 182 to the positive input. In operation, referring to wave form 66a of FIG. 4, the output of op amp 149 comprises a series of upside down triangles having bases along reference level 66b and apexes a distance below reference level 66b which varies inversely with engine speed. This voltage is smoothed and averaged by a low pass filter comprising resistor 179 and capacitor 181 to become a DC voltage referenced to ground and therefore varying directly with engine speed. This voltage is applied to the negative input of op amp 178 to be compared with a reference voltage derived from the junction 166 and indicative of highway driving. The output of op amp 178 will therefore be low at engine speeds above a reference speed determined by the voltage at junction 166 and high at engine speeds below such reference speed.

The speed signal output of op amp 178 is connected to an input of a NOR gate 184 in control logic 71. Control logic 71 further has an input terminal 185 connected through manifold vacuum switch 31 to ground when the manifold vacuum of engine 10 is below a reference vacuum indicative of steady state highway driving and not so connected when engine manifold vacuum is above the reference vacuum. Terminal 185 is also connected through a resistor 186 to battery 26, indicated as B in FIG. 3. Terminal 185 is further connected through a resistor 188, an inverter 189 and a diode 190 to the other input of NOR gate 184. The junction of resistor 188 and inverter 189 is connected through a capacitor 192 to ground.

Control logic 71 further includes an input terminal 193 connected through the low temperature switch 27 to ground when the engine coolant temperature is above a reference temperature indicative of a "warmed-up" engine and not so connected when the engine coolant temperature is below the reference temperature. Input terminal 193 is connected through a resistor 194 to battery 26, indicated as B, and through a resistor 196, a diode 197 and another diode 198 to the other input of NOR gate 184, the junction 200 of diodes 190 and 198 being connected through a resistor 201 to ground. A capacitor 202 connects the junction of resistor 196 and diode 197 to ground; while a resistor 204 connects the junction 205 of diodes 197 and 198 to ground.

Control logic 71 has a further input terminal 206 connected through the engine start switch 35 to ground when the engine start motor 34 is being actuated and not so connected when start motor 34 is not being actuated. Input terminal 206 is connected through a resistor 208 to battery 26 at B and also through a resistor 209, an inverter 210 and a diode 212 to junction 205. A capacitor 213 connects the junction of resistor 209 and inverter 210 ground. A NOR gate 214 has one input connected to the output of NOR gate 184 and the other input connected to junction 205. The output of NOR gate 214 is connected through resistor 153 to the collector of transistor 146 in switch 63. The output of NOR gate 184 is connected through a resistor 216 to the collector of transistor 146 and further to junction 45 in switch 43.

In the operation of control logic 71, it will be seen that the output of NOR gate 184 controls the condition of switch 43 to determine whether the conventional spark timing pulses or retarded spark timing pulses will be passed to Schmitt trigger 23. As previously described, the conventional spark timing pulses will be so passed when the voltage signal at junction 45 is high. NOR gate 184 will supply this voltage output to junction 45 only when its inputs are all low. Normal highway driving conditions produce a high speed, high temperature, high manifold vacuum and no engine starting. Examination of the circuit of control logic 71 in FIG. 3 shows that these conditions produce low inputs to NOR gate 184: high speed producing a low output from op amp 178, high manifold vacuum and no engine start supplying high voltage from battery 26 to inverters 189 and 210 to provide low voltage therefrom and high temperature grounding terminal 193 to supply a low voltage therefrom. If any one or more of these conditions change, the output of NOR gate 184 goes low to provide a low signal voltage to junction 45 and switch 43 and pass the retarded spark pulses to Schmitt trigger 23.

Control logic 71 also controls the choice of small or large retard by the combined outputs of NOR gates 184 and 214 to switch 63. Reference to the table of FIG. 6 shows that, except during engine start or the previously described normal highway driving condition, the selection of small or large retard is dependent upon engine temperature: a cold engine requiring a large retard and a warm engine requiring a small retard. In addition, the large retard is desired during engine start, whether the engine is warm or cold. The combination of NOR gates 184 and 214 with resistors 153 and 216 accomplishes these desires. Low vacuum or speed with high temperature produce a low output from NOR gate 184 and a high output from NOR gate 214 to place voltage V across resistors 216 and 153 in series and allow the base of transistor 145 to be switched, through transistor 146, by flip-flop 58. However, low temperature or the combination of start switch actuation and low speed (low speed will always be present when starting) will produce low outputs on both NOR gates 184 and 214 to hold transistor 145 off.

Referring again to FIG. 3, capacitor 76, which is the second capacitor 76 shown in FIG. 2, is connected between the inverting input of op amp 149 and the collector of an NPN transistor 217, the emitter of which is connected to the output of op amp 149 and the base of which is connected both through a resistor 218 to the output of op amp 149 and through a resistor 220 to a junction 211 of inverter 210 and diode 212 in control logic 71. Transistor 217, along with resistors 218 and 220, comprises the switch 74, which can be actuated to switch capacitor 76 in parallel with capacitor 151 to slow the integration rate of timing integrator 66. The closure of engine start switch 35 grounds terminal 206 and thus causes a high voltage to be supplied from inverter 210 to turn on transistor 217 and connect capacitor 76 in parallel with capacitor 151; the opening of engine start switch 35 causes a low voltage to be supplied from inverter 210 to turn off transistor 217 and remove capacitor 76 from the feedback path of op amp 149. As previously described, capacitor 151 has a capacitance value chosen to make reasonably full use of the normal regulated voltage V in charging and discharging capacitor 151 at speeds down to idle. The capacitance of capacitor 76 is chosen so that the parallel combination of capacitor 76 and 151 will produce a slower ramping rate for timing integrator 66 which makes reasonable use of the voltage available under engine start conditions at the engine cranking speed. Of course, as previously mentioned, the ramping rates for both ramp directions will be in the same proportion so that the correct relationship between the up ramp, which correlates time with crank angle, and the down ramp, which determines the retard, will be retained.

Since the circuit of FIG. 3 may be provided on a separate circuit chip from that including the conventional pickup and dwell circuitry 16 and Schmitt trigger 23, special circuitry may be provided for removing the diode voltage drops of transistor 70 and the diode numbered 35 in the previously identified Richards et al. reference. This would be done to lower the reference voltage applied to the inverting input of op amp 87 and the voltage at the bottom of coil 15 to ground during engine starting, when the voltage output of coil 15 is very small in amplitude and the vehicle power voltage B, reduced by the heavy starting current drawn by the starter motor, can drop below the value required to maintain the regulated voltages V and V/2. This embodiment includes a transistor 221 having a grounded emitter, a collector connected to the collector of transistor 93 and a base connected through a resistor 222 to junction 211 in control logic 71. Another NPN transistor 224 has its emitter grounded, its base connected through a resistor 225 to junction 211 and its collector connected through a resistor 226 to a terminal 228. A zener diode 229 and capacitor 231 in parallel are connected across the emitter and collector of transistor 224; and terminal 39 is connected through a resistor 230 and diode 232 to ground. A capacitor 233 is connected between input 39 and terminal 228. This capacitor 233 is actually the capacitor numbered 18 in the cited Richards et al. reference; and junction 39 corresponds to the junction between capacitor 18 and resistor 44 in the Richards et al. reference, so that junction 39 and terminal 228 in FIG. 3 of this application are thus connected across coil 15 of FIG. 1.

In normal engine operation, engine start switch 35 is open and inverter 210 therefore supplies a low voltage to turn off transistors 224 and 221. Transistor 93 is thus maintained in a conducting state as previously described and the pickup and dwell circuit 16, Schmitt trigger 23 and spark retard circuit 22 operate in the normal manner as described in the Richards et al. reference and this specification. When start switch 35 is closed, however, inverter 210 provides a high voltage to turn on transistors 221 and 224. Transistor 221 shunts the diode drop of transistor 93 to remove it from the voltage divider providing the reference voltage to the inverting input of op amp 87. Transistor 224, when conducting, effectively removes a corresponding diode drop of the aforementioned Richards et al. reference from the pickup and dwell circuit 16. Zener diode 229 is similar in function to zener diode 119 in providing protection to the circuit of FIG. 3 from high voltage spikes introduced from other engine circuits. Of course, if circuits 16, 22 and 23 are all on the same chip or otherwise matched in temperature at all times, the immediately proceeding circuitry is not needed.

Sample values are listed below for the circuit elements of FIG. 3.

OP AMPS 87, 122, 154, 167 — National Semiconductor LM 2901 module 149, 178 — National Semiconductor LM 2904 module

NOR GATES all — RCA CD 4001

TRANSISTORS 93, 105, 107, 114, 117, 118, 138, 141, 145, 146, 221, 224 — RCA CA 3081 module

217 — 2N4401

DIODES 98, 99, 127, 173, 190, 197, 198, 212, 232 — 1N485B 119, 229 — 1N5240

81 — 1N4739A

CAPACITORS 76, 120, 231 — 2.2 mF
82 — 1.0 mF
97 — 22 pF
129 — 91 pF
151 — 0.1 mF
165 — 0.001 mF
170 — 0.0015 mF
181 — 4.7 mF
192, 202, 213 — 0.001 mF
233 — 2200 pF

RESISTORS

126 — 10M
158 — 5.1M
89, 130, 201, 204 — 1M
182 — 510K
123 — 100 K
103, 106, 111, 113, 115, 121, 139, 142, 147, 153, 179, 188, 196, 209, 218, 222, 225 — 47K
155, 157 — 39K
88, 91, 220 — 30K
230 — 22K
96, 150, 169, 171 — 20 K
109 — 15K
95, 125 — 10K
92, 186, 194, 208 — 1.8K
110, 226 — 100
80 — 180½ W
134, 175 — 287K 1%
177 — 237K 1%
137 — 44.2K 1%
162 — 41.2K 1%
143 — 33.2K 1%
159 — 28.7K 1%
83, 84 — 10K 1%
161 — 6.34K 1%

The embodiment described above, including those sample values listed and the specific circuits, is only one embodiment of this invention that will occur to those skilled in the art after reading this disclosure. Therefore this invention should be limited only by the claims which follow.

The embodiments of the invention is which an exclusive property or privilege is claimed are defined as follows:

1. A spark timing control for a spark ignited combustion engine having a crankshaft characterized by a range of normal rotational speeds in engine operation other than during engine starting and further having cranking means actuatable to rotate the crankshaft during engine starting at a cranking speed less than any of the normal rotational speeds, the spark timing control comprising, in combination:

first means driven by the crankshaft and effective to generate normal spark timing signals at predetermined angles of crankshaft rotation;

second means responsive to each normal spark timing signal to generate therefrom, a retarded spark timing signal retarded from the normal spark timing signal by a predetermined angle of crankshaft rotation, the second means comprising bidirectional ramp means including capacitance means normally having a first capacitance effective to establish first ramping time rates but further having a selectable second capacitance greater than the first capacitance and effective to establish second ramping time rates slower than the first ramping time rates in substantially equal proportion;

third means responsive to a first predetermined set of engine operating conditions to select the normal spark timing signals for engine spark timing control and responsive to one of a) a second set of engine operating conditions and b) actuation of the cranking means to select the retarded spark timing signals for engine spark timing control; and fourth means responsive to actuation of the cranking means to select the second capacitance of the second means, whereby the ramping time rates are slowed proportionally to enable the bidirectional ramp means to operate without clipping at the cranking speed and thus maintain the predetermined crankshaft angle of retard in the retarded spark timing signals.

2. A spark timing control for a spark ignited, internal combustion engine having a rotating crankshaft characterized by a range of normal rotational speeds during engine operation other than engine starting, cranking means actuatable to rotate the crankshaft for engine starting at a cranking speed less than any of the normal rotational speeds and means for generating fuel ignition sparks in response to spark timing pulses, the spark timing control comprising, in combination:

first means driven by the crankshaft and effective to generate normal spark timing pulses at predetermined angles of crankshaft rotation;

a first capacitor;

second means effective at the time of each normal spark firing pulse to commence a progressively varying voltage in a first direction across the first capacitor at a first substantially constant rate and, when the voltage across the capacitor reaches a reference, to generate a retarded spark timing pulse;

third means effective at the time of each retarded spark timing pulse to commence a progressively varying voltage across the first capacitor in a direction opposite the first direction at a second substantially constant rate slower than the first substantially constant rate and continuing until the next following normal spark timing pulse;

first switch means responsive to a first predetermined set of engine conditions to connect the first means to the spark generating means and thereby generate ignition sparks at times determined by the normal spark timing pulses and further responsive to actuation of one of a) the cranking means and b) a second predetermined set of engine operating conditions to connect the second means to the spark generating means and thereby generate fuel ignition sparks at times determined by the retarded spark timing pulses;

a second capacitor;

second switch means responsive to actuation of the cranking means to connect the second capacitor in parallel with the first capacitor during engine starting, whereby the first and second substantially constant rates of the progressively varying voltage are reduced in the same proportion to prevent clipping of the progressively varying voltage at the cranking speed and thus maintain the desired timing of the retarded spark timing pulses during engine starting.

3. A method of controlling the spark timing of a spark-ignited combustion engine having a crankshaft characterized by a range of normal rotational speeds in engine operation other than during engine starting and further having cranking means actuatable to rotate the crankshaft during engine starting at a cranking speed less than any of the normal rotational speeds, the method comprising:

generating normal spark timing signals at predetermined times as the crankshaft rotates;

generating a bidirectional ramp voltage across capacitor means normally having a first capacitance in a first direction at a first time rate and a second direction, opposite the first direction, at a second time rate;

changing the direction of the ramp voltage from the second to the first direction at the time of each normal spark timing signal;

changing the direction of the ramp voltage from the first to the second direction each time the ramp voltage equals a predetermined reference voltage;

generating, each time the ramp voltage equals the predetermined reference voltage, a retarded spark timing signal corresponding to, but retarded in crankshaft angle with respect to, a normal spark timing signal;

selecting, in response to at least one engine operating condition, one of each normal and corresponding retarded spark timing signals during normal engine operation;

selecting, during actuation of the cranking means, the retarded spark timing pulses;

increasing the capacitance of the capacitor means to a second capacitance during actuation of the cranking means, whereby the first and second time rates are slowed proportionally to prevent clipping of the bidirectional ramp voltage at cranking speed.

* * * * *

UNITED STATES PATENT AND TRADEMARK OFFICE
CERTIFICATE OF CORRECTION

PATENT NO. : 4,133,325
DATED : January 9, 1979
INVENTOR(S) : Gene A. West

It is certified that error appears in the above-identified patent and that said Letters Patent are hereby corrected as shown below:

Column 1, line 42, "change" should read -- changed --.

Column 16, claim 2, line 9, after "generate" insert -- fuel --.

Signed and Sealed this

Twenty-sixth Day of February 1980

[SEAL]

Attest:

SIDNEY A. DIAMOND

Attesting Officer

Commissioner of Patents and Trademarks